US006757711B2

(12) United States Patent
Toga

(10) Patent No.: US 6,757,711 B2
(45) Date of Patent: *Jun. 29, 2004

(54) METHOD AND APPARATUS FOR DELIVERING DATA

(75) Inventor: James E. Toga, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/227,245

(22) Filed: Aug. 26, 2002

(65) Prior Publication Data

US 2003/0115275 A1 Jun. 19, 2003

Related U.S. Application Data

(63) Continuation of application No. 09/406,335, filed on Sep. 27, 1999, now Pat. No. 6,449,637, which is a continuation of application No. 08/801,508, filed on Dec. 31, 1996, now Pat. No. 5,987,504.

(51) Int. Cl.$^7$ .............................................. G06F 15/16
(52) U.S. Cl. ....................................... 709/203; 709/206
(58) Field of Search .............................. 709/203, 206, 709/225, 226, 229, 235, 232

(56) References Cited

U.S. PATENT DOCUMENTS

| | | | | |
|---|---|---|---|---|
| 5,761,663 A | * | 6/1998 | Lagarde et al. | 707/10 |
| 5,768,515 A | * | 6/1998 | Choquier et al. | 709/206 |
| 5,781,901 A | * | 7/1998 | Kuzma | 707/10 |
| 5,806,044 A | * | 9/1998 | Powell | 705/14 |
| 5,859,967 A | * | 1/1999 | Kaufeld et al. | 713/200 |
| 5,903,723 A | * | 5/1999 | Beck et al. | 709/200 |
| 5,987,504 A | * | 11/1999 | Toga | 709/206 |
| 6,449,637 B1 | * | 9/2002 | Toga | 709/206 |

* cited by examiner

*Primary Examiner*—Mehmet B. Geckil
(74) *Attorney, Agent, or Firm*—Kenyon & Kenyon

(57) ABSTRACT

A request message is sent by a client to a server according to a first protocol (e.g., HTTP) identifying a data file and a storage location, such as an E-mail address. In response the server forwards the requested data file to the E-mail address according to a second protocol (e.g., SMTP). In doing so large amounts of data can be retrieved at a future time when network traffic is lower. Also, if the client does not have the necessary hardware/software setup, the requested data file can be retrieved by a second client which may have capability to present the information in the data file to the user. The different types of information that are capable of being handled by software operating at the client (e.g., web browser) can be handled by the E-mail software operating at the client.

20 Claims, 4 Drawing Sheets

METHOD AND APPARATUS FOR DELIVERING DATA

This application is a continuation of U.S. Ser. No. 09/406,335 filed on Sep. 27, 1999, now U.S. Pat. No. 6,449,637 which is a continuation of U.S. Ser. No. 08/801,508 filed on Dec. 31, 1996, now U.S. Pat. No. 5,987,504.

BACKGROUND OF THE INVENTION

The present invention pertains to a method and apparatus for delivering data over a network. More particularly, the present invention pertains to the indirect transfer of information in response to an initial user operation.

The Internet system is a network of computer systems that allows the sending of data or information between a source component (sometimes referred to as a host or server) and a destination component (sometimes referred to as a client) using a protocol such as TCP/IP (Transmission Control Protocol/Internet Protocol). As an example, referring to FIG. 1 a client 10, such as a home personal computer (PC) is coupled to a server 20 via a network 30. In this example, server 20 is a so-called "web-site" on the World Wide Web system (a portion of the Internet system). Client 10, via the operation of a software program called a browser (e.g., Netscape Navigator® 3.0 by Netscape Communications Corp.), accesses information at server 20 by using a URL (Universal Resource Locator) which identifies server 20 or a file located at server 20. The browser utilizes a protocol, such as HyperText Transfer Protocol (HTTP), to ask for "pages" (or "web pages") of information that contain text or richtext (e.g., multimedia such as audio and/or video images). The content of each page may include hypertext links that may lead to other pages at server 20 or other servers coupled to network 30. Server 20 presents information in a form called a "web page" to client 10 via network 30, where each web page typically includes Hypertext Markup Language (HTML). A more detailed explanation of HTML and HTTP can be found in "HTML Sourcebook" 2d Ed., by Ian S. Graham, 1996, John Wiley & Sons, Inc. The connection between client 10 and server 20 can be direct, but typically includes one or more nodes 31, 32, 33 which relay information to its appropriate destination using the TCP/IP protocol. The accessing of the information occurs in "real-time" in that information from server 20 is provided to client 10 at the same time it is requested. The transaction of information between server 20 and client 10 can be referred to as a series of request-response interactions where either client 10 or server 20 or both request and/or receive information from the other.

The network 30 over which client 10 accesses information from server 20 may have features making it undesirable or uneconomical for such a transfer of information. For example, if network 30 includes ISDN telephone lines, such lines usually are more costly than plain old telephone service (POTS) lines. Also, client 10 may be trying to access information from server 20 when activity on the network 30 from other users is at a peak. In such a circumstance, the available bandwidth for the information requested by client 10 will be reduced, thus increasing the amount of time required for the transfer of such information. In addition to network problems, the server 20, itself, may be overloaded with requests, thus delaying the transfer of information between server 20 and client 10. Accordingly, there is need for a method and apparatus that allows for the delivery of data or information between a server and a client user that overcomes these aforementioned problems.

SUMMARY OF THE INVENTION

According to the apparatus and method of the present invention, a client is provided which is adapted to create a request message designating a desired data file and a storage address. The request message is sent to a server according to a first protocol at a first time. Coupled to the client is a storage device that includes a plurality of storage locations. The storage device is adapted to receive the data file and store it at a storage location identified by the storage address. The server is coupled to the client and is adapted to receive the request from the client and is adapted to send the data file to the storage device according to a second and different protocol at a second time.

DETAILED DESCRIPTION

Figure 1:
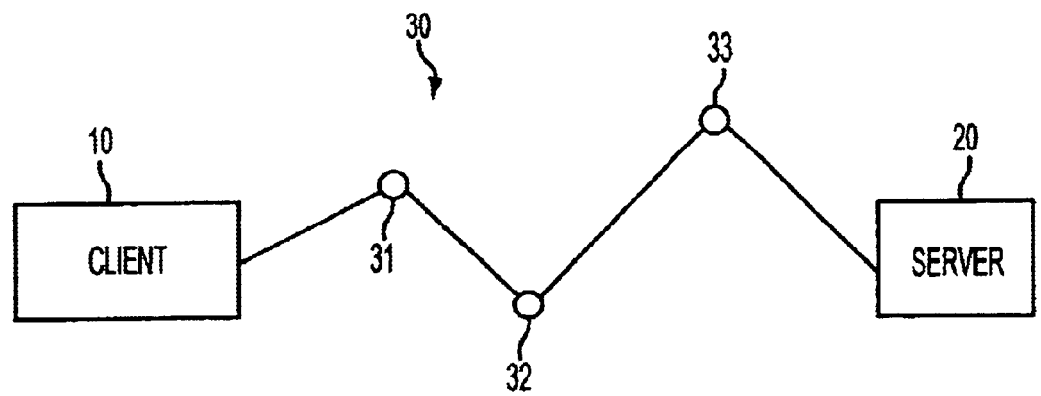
FIG. 1 is an exemplary block diagram of a network system as it exists in the prior art.
Figure 2:
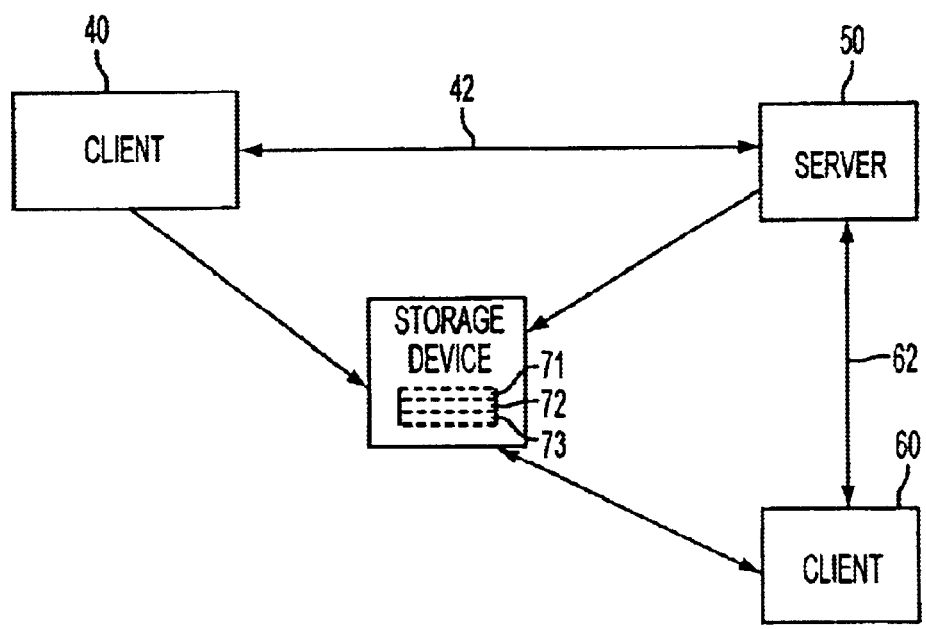
FIG. 2 is a block diagram of an exemplary network environment for implementing an embodiment of the present invention.
Figure 3:
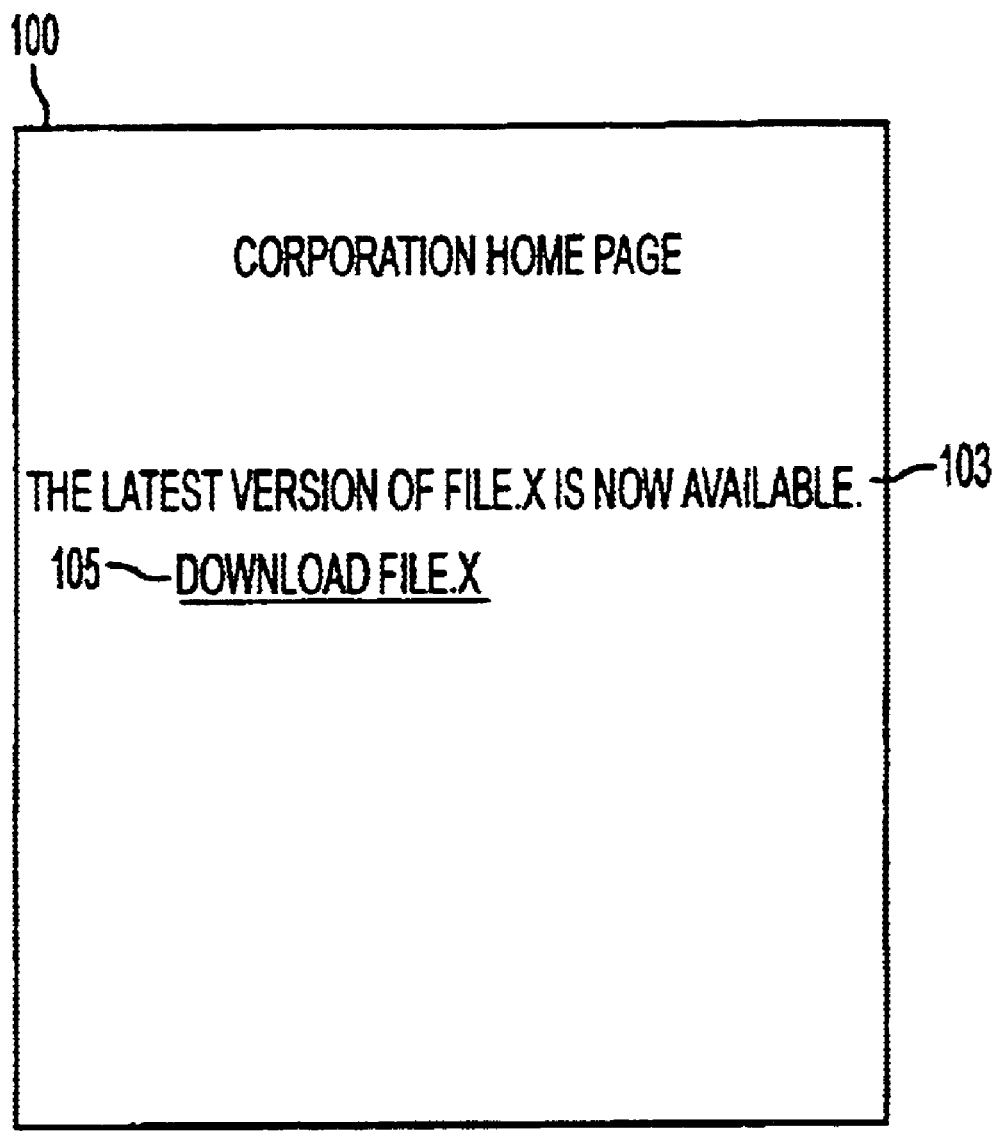
FIG. 3 is an example of a web-page employing HTML.

Referring to FIG. 2, an exemplary network environment for implementing an embodiment of the present invention is shown. A client 40 is provided coupled to a server 50 via a network 42. The connection between client 40 and server 50 can be direct, however network 42 typically includes one or more nodes for transferring information between client 40 and server 50. One skilled in the art will appreciate that the paths for transferring data between client 40 and server 50 may change for each data transaction. As an example of the present invention, client 40 under the operation of a browser program or the like accesses server 50 over network 40 using a URL that resides at server 50. During such an access, client 40 under the operation of the browser software sends a request for a page of information residing at the URL in server 50. When server 50 receives such a request, a first page 100 (see FIG. 3) of information that includes HTML content (e.g., text, audio, video images, hypertext links, etc.) is sent to client 40 over network 42. In this example, it is assumed that this first page 100 of information includes plain text 103 and a hypertext link 105 that references a file (File.X) that can be downloaded from server 50 or another server referenced by hypertext link 105 according to HTML. In a typical request-response transaction, client 40 would request the download of File.X over network 42 at a first time using a request under a first protocol (e.g., HTTP) and server 50 would respond in due time by facilitating the transfer of File.X to client 40 under HTTP. According to this example of the present invention, File.X is not transferred by the server using HTTP necessarily. Instead, the file is sent by server 50 in a second transaction using a second protocol (e.g., Simple Mail Transport Protocol or SMTP) to that client 40 or a second client 60 at a second time (which can be immediately subsequent to the first time). In this example, client 60 is coupled to server 50 via a second network 62.

Several advantages are realized in transferring File.X in such a manner. First, if network 42 is currently experiencing excessive use., the requested file can be sent to client 40 or client 60 when network 42 or network 62 is experiencing lower usage. For example, an administrator may initialize server 60 so that requested files are sent by the second protocol at a second time during a prohibited time period such as a so-called "prime-time" (e.g., between 8:00 p.m. and 11:00 p.m. ET). In this manner, requested files are always sent at a later time to a designated storage location (e.g., an E-mail address) or server 60 requests an E-mail address from client 40. Second, if server 50 is experiencing a relatively large number of accesses, it may be more efficient to have the file sent at a later time when usage of the resources at server 50 has been reduced. Server 50 can detect such a condition if the number of requests per unit of time exceeds a predetermined threshold (e.g., set by an administrator). Third, If the number of transmission errors per unit of time perceived by server 60 exceeds a predetermined threshold, it may be an indication that there is an appreciable amount of traffic on networks 42, 62. Accordingly, server 60 will always send requested files to a designated storage location (e.g., an E-mail address) or server 60 can request an E-mail address from client 40. Also, if network 42 includes relatively expensive ISDN lines, than it would be more economical to send the file to client 40 over network 42 when usage is lower and bandwidth is higher. Likewise, it may be more economical to have the file transferred over network 62 if it includes relatively inexpensive POTS lines.

Figure 4:
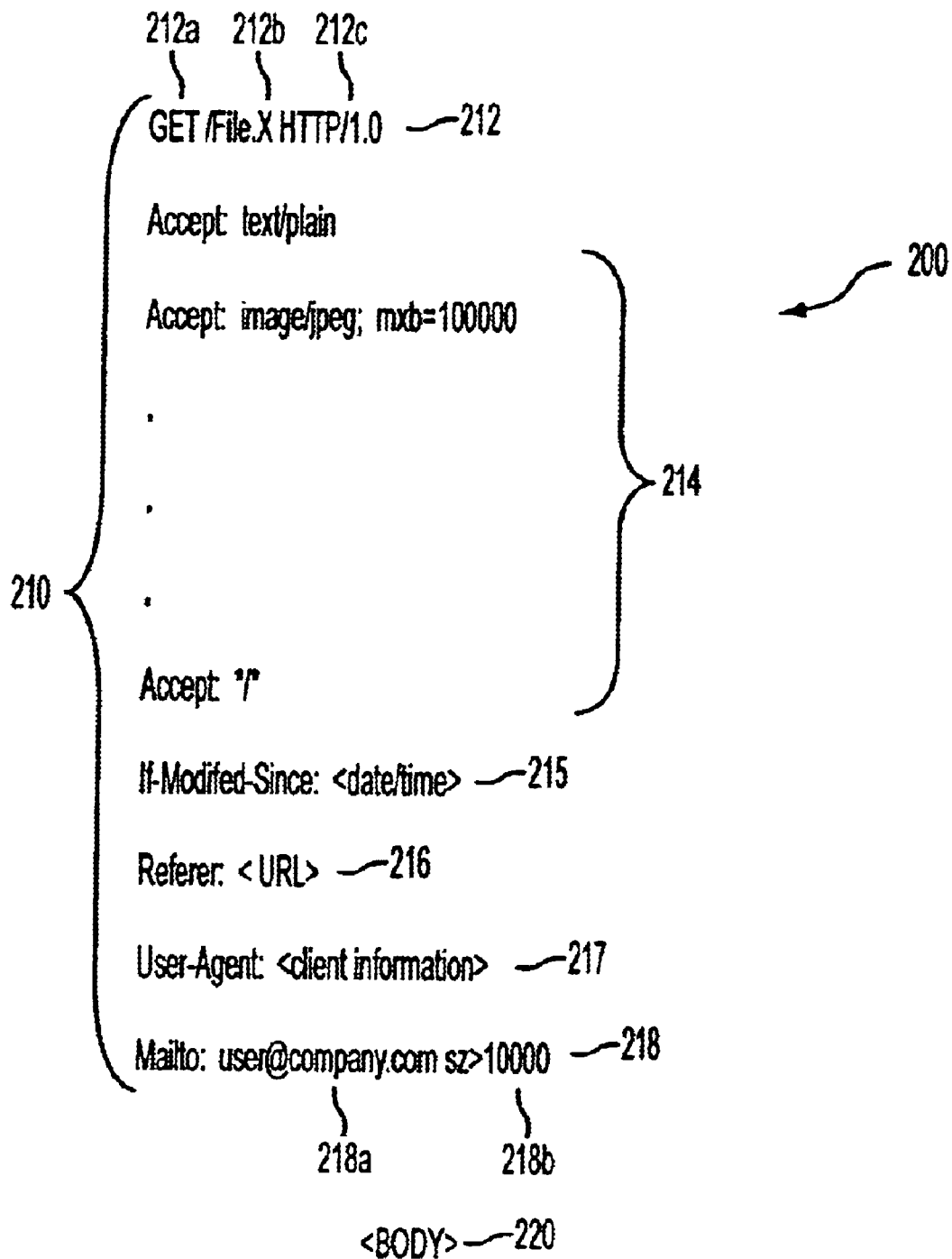
FIG. 4 is an example of a client request message have a format according to an embodiment of the present invention.

The request by the client for downloading File.X can conform to the Hypertext Transfer Protocol (HTTP) as modified by an embodiment of the present invention. Referring to FIG. 4, an example of a client request using HTTP constructed according to the present invention is shown. The client request message 200 includes a request header 210 which is prepared by the operation of browser software at client 40. In this example, client 40 is requesting File.X and the request header 210 includes a method header 212 that includes three text fields 212*a–c*. The first text field 212*a* is the HTTP method specification which indicates the action to be taken on the specified file or the like. In this example, "GET" is used to indicate that the requested file is to be sent to the client. The second text field 212*b* identifies the file to be accessed (i.e., File.X). The third text field 212*c* identifies the HTTP protocol version being used by client 40. The accept encoding field 214 of request header 210 indicates what file types are acceptable to client 40. For example "Accept: */*" indicates that all types of data will be accepted by the client and "Accept: text/plain" indicates that client 40 will accept plain text files. There can also be a priority order in accept encoding field 214 where the list of "Accept" entries indicates the preference of file types (i.e., "Accept" entries appearing at the beginning of accept encoding field 214 are preferred over "Accept" entries appearing lower in accept encoding field 214). The accept encoding field 214 can also set a maximum file size value. For example, "Accept: image/jpeg; mxb=100000" indicates that an image in the JPEG (Joint Photographic Experts Group) format will be accepted if it has a file size of less than or equal to 100 kilobytes. An "If-Modified-Since" field 215 indicates that the designated file in method header 212 should be sent if it has been modified after the date/time stamp indicated. A "Referer" field 216 indicates the URL where the request for the file originated. A "User-Agent" field 217 contains information about client 40 making the request according to the HTTP protocol.

According to this example of the present invention, request header 200 includes an additional field 218 referred to in FIG. 4 as a "mailto" field. A first subfield 218*a* of mailto field 218 indicates a destination storage address such as an E-mail address for the requested file (e.g., user@company.com) and server 50 is given the option of sending the requested file to the indicated address or to client 40 in a conventional manner (e.g., according to the HTTP protocol). Alternatively, server 50 may be required to send the requested file to the indicated E-mail address when designated. As with accept encoding field 214, a second subfield 218*b* can be provided for size restriction purposes. In this example, the requested file is only sent to the designated E-mail address if the size of the requested file is greater than 10 kilobytes. The second subfield 218*b* can be used for other types of restrictions such as file type (e.g. send the requested file to the designated E-mail address if it is of a specified file type). The request header 210 is followed by the body 220 of request message 200 having a format defined by the HTML and HTTP specifications. By using additional field 218, server 50 is able to send the file to the designated E-mail address at a better transfer time (e.g., when there is lower traffic on network 42 or lower usage of server 50). Also, if network 42 includes the relatively more expensive ISDN lines, server 50 is able to send the file to the E-mail address over less expensive POTS lines (e.g., to client 60 over network 62).

Figure 5:
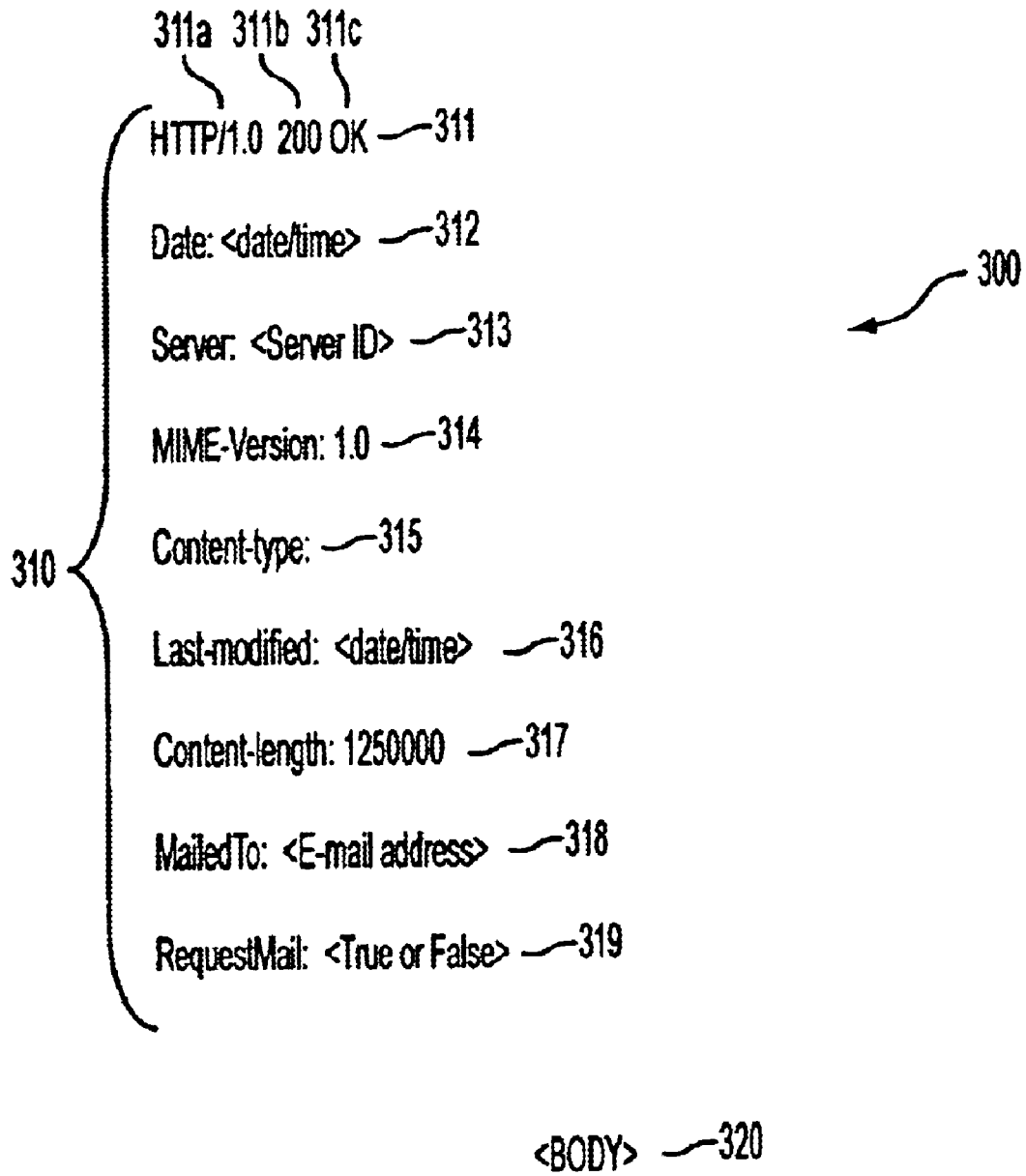
FIG. 5 is an example of a server request message have a format according to an embodiment of the present invention.

Referring to FIG. 5, under the HTTP protocol, server 50 can answer the request of client 40 with a response message 300 which includes a response header 310. Response header 310 includes a status field 311 that identifies the HTTP version number (in first subfield 311*a*), a status code (in second subfield 311*b*) indicating the status of the connection between server 50 and client 40, and an explanation (in third subfield 311*c*). In this example, the status line indicates that the transfer was successful (via status code 200 and explanation "OK"). A date field 312 indicates via a date/time stamp when the requested file was assembled for transfer. A server field 313 identifies the server and its version number. A MIME-version field 314 (Multipurpose Internet Mail Extensions) identifies the protocol version number used by server 50. A content-type field 315 indicates the MIME content type, typically in a type/subtype format. Examples of MIME content type include text/html (i.e., an HTML text document), image/jpeg (i.e., an JPEG image), multipart/mixed (i.e., typically an E-mail message with multiple parts). A last-modified field 316 indicates by a date/time stamp the last time the requested file was updated. A content-length field 317 indicates the length of the requested file (e.g., 1.25 Megabytes). According to an embodiment of the present invention, response header can also include an additional field, a "mailedto" field 318 which would identify where the requested file was sent by E-mail. If this field is used, the browser software operating at client 40 would indicate to the user that the requested document was sent to the stipulated E-mail address. Alternatively, server 50 can use a second additional field, a "RequestMail" field 319 to request that client 40 provide an E-mail address for the sending of the requested file. Accordingly, client 40 can "respond" to the request for an E-mail address by supplying one in the MailTo field of request header 310 in a second request message. The response header 310 is followed by the body 320 of response message 300 having a format defined by the HTML and HTTP specifications.

Referring back to FIG. 2, the designated storage address or E-mail address can refer to a storage location at client 40 or client 60. In this embodiment, the storage address identifies a storage location 71, 72, 73, etc. in a storage device 70 such as a server furnished by an Internet Service Provider (ISP) for example. After the requested file is stored at the storage location (71, 72, 73) referenced by the storage address (e.g., the designated E-mail address) in storage device 70, the requested file can be retrieved by client 40 and/or second client 60.

As stated above, the requested data can include various data types (e.g., audio, video, text, etc. appearing in an HTML page). As stated above the HTTP protocol uses MIME types to encode information that is passed between server 50 and client 40. World Wide Web (WWW or Web) browser software (e.g., Netscape Navigator® software, Microsoft Explorer® software by Microsoft Corporation) operating at client 40, for example, recognizes the MIME types and can present the different data types at client 40 (assuming that client 40 has the appropriate hardware/software setup). When the requested data is sent to a designated E-mail address, the native MIME types are retained. The client (e.g., client 40, second client 60) that receives the data in an E-mail message will be able to present the data correctly, due to the presence of the data type information. E-mail software operating at client 40 or second client 60 such as the ccMail® software package designed by Lotus Development Corp. has the capability of presenting the different data types designated by the MIME extensions.

Using the delivery method of the present invention offers several advantages. First, the final retrieval of requested data can be accomplished from a site other than the one that is currently requesting the data. For example, in FIG. 2, second client 60 can perform the final retrieval of the requested file File.X from the designated E-mail address instead of client 40 which made the initial request. The requested data may include audio, video, or other types of data that cannot be properly played back or displayed at client 40 (e.g., because of a deficient hardware/software setup). However, most E-mail systems allow access from a number of sites, such as second client 60, which may be more suitable to the presentation of this so-called "rich" content. Second, the data delivery system of the present invention allows a third party requester to find and deliver the data content to another recipient. Thus, the user at second client 60 can request that the user at client 40 find and deliver specific data. In environments which do not provide full connectivity (i.e., many parts of the Internet system are transiently connected), the data delivery system of the present invention allows a third party (e.g., client 40) to deliver research results to requesting principals (e.g., second client 60).

Although several embodiments are specifically illustrated and described herein, it will be appreciated that modifications and variations of the present invention are covered by the above teachings and within the purview of the appended claims without departing from the spirit and intended scope of the invention. For example, though the HTTP and SMTP protocols are used in the embodiment of the present invention described above, the present invention is not limited to use of these protocols alone.

What is claimed is:

1. An apparatus for delivering data comprising:
    a server to receive a request message from a client designating a data file and to determine whether said request message was received at said server during a prohibited time period, said server to create a response message if said request is received at said server during the prohibited time period and to send said response message to said client according to a first protocol, said response message requesting a storage address from said client, said server further to receive a second request message identifying the storage address, and said server further to send said data file to a storage device.

2. The apparatus of claim 1 further comprising:
    a client to send said request message and said second request message to said server.

3. The apparatus of claim 2 wherein said first protocol is Hypertext Transfer Protocol (HTTP).

4. The apparatus of claim 3 wherein said server is to send said data file to the storage device according to a second and different protocol.

5. The apparatus of claim 4 wherein said second protocol is a Simple Mail Transport Protocol (SMTP), and said storage address is an electronic mail address.

6. An apparatus for delivering data comprising:
    a server to receive a request message and to determine whether a number of requests per unit of time at said server has exceeded a predetermined threshold, said server to create a response message if said request is received at said server when the number of requests per unit of time at said server has exceeded the predetermined threshold and send said response message to a client according to a first protocol, said response message requesting a storage address from said client, said server further to receive a second request message identifying the storage address, and to send said data file to a storage device.

7. The apparatus of claim 6 further comprising:
    a client to send said request message and said second request message to said server.

8. The apparatus of claim 7 wherein said first protocol is Hypertext Transfer Protocol (HTTP).

9. The apparatus of claim 8 wherein said server is to send said data file to the storage device according to a second and different protocol.

10. The apparatus of claim 9 wherein said second protocol is a Simple Mail Transport Protocol (SMTP), and said storage address is an electronic mail address.

11. An apparatus for delivering data comprising:
    a server to receive a request message and determine whether a number of transmission errors per unit of time at said server has exceeded a predetermined threshold, said server to create a response message if said request message is received at said server when the number of transmission errors per unit of time at said server has exceeded the predetermined threshold and send said response message to a client according to a first protocol, said response message requesting a storage address from said client, said server further to receive a second request message identifying the storage address, and said server is further to send said data file to a storage device.

12. The apparatus of claim 11 further comprising:
    a client to send said request message and said second request message to said server.

13. The apparatus of claim 12 wherein said first protocol is Hypertext Transfer Protocol (HTTP).

14. The apparatus of claim 13 wherein said server is to send said data file to the storage device according to a second and different protocol.

15. The apparatus of claim 14 wherein said second protocol is a Simple Mail Transport Protocol (SMTP), and said storage address is an electronic mail address.

16. An apparatus for delivering data comprising:
    a server to receive said request message and determine whether a file size for a data file at said server has exceeded a predetermined threshold, said server to create a response message if said request is received at said server when the file size for said data file at said server has exceeded the predetermined threshold and to send said response message to a client according to a first protocol, said response message requesting a storage address from said client, said server further to receive a second request message identifying the storage address, and said server to send said data file to a storage device.

17. The apparatus of claim 16 further comprising:

a client to send said request message and said second request message to said server.

18. The apparatus of claim 17 wherein said first protocol is Hypertext Transfer Protocol (HTTP).

19. The apparatus of claim 18 wherein said server is to send said data file to the storage device according to a second and different protocol.

20. The apparatus of claim 19 wherein said second protocol is a Simple Mail Transport Protocol (SMTP), and said storage address is an electronic mail address.

* * * * *